United States Patent
Fan et al.

(10) Patent No.: US 12,041,952 B2
(45) Date of Patent: Jul. 23, 2024

(54) MICROWAVE AND CONDUCTION COMBINED HEATING METHOD FOR IMPROVING GEL STRENGTH OF SURIMI PRODUCTS

(71) Applicants: Jiangnan University, Wuxi (CN); ANJOY FOODS GROUP CO., LTD., Xiamen (CN)

(72) Inventors: Daming Fan, Wuxi (CN); Jianlian Huang, Xiamen (CN); Hongwei Cao, Wuxi (CN); Xuepeng Li, Jinzhou (CN); Hao Zhang, Wuxi (CN); Wenguo Zhou, Xiamen (CN); Bowen Yan, Wuxi (CN); Xidong Jiao, Wuxi (CN); Tenghui Yu, Xiamen (CN); Wenhai Zhang, Xiamen (CN); Weijian Ye, Xiamen (CN); Jiangping Chen, Xiamen (CN); Dengying Lei, Xiamen (CN); Jianxin Zhao, Wuxi (CN); Qingmiao Zhang, Xiamen (CN); Wei Chen, Wuxi (CN)

(73) Assignees: JIANGNAN UNIVERSITY, Wuxi (CN); ANJOY FOODS GROUP CO., LTD., Xiamen (CN)

( * ) Notice: Subject to any disclaimer, the term of this patent is extended or adjusted under 35 U.S.C. 154(b) by 551 days.

(21) Appl. No.: 16/178,942

(22) Filed: Nov. 2, 2018

(65) Prior Publication Data
US 2019/0142044 A1 May 16, 2019

Related U.S. Application Data

(63) Continuation of application No. PCT/CN2018/077728, filed on Mar. 1, 2018.

(30) Foreign Application Priority Data

May 3, 2017 (CN) .......................... 201710303148.6

(51) Int. Cl.
*A23L 29/281* (2016.01)
*A23L 3/01* (2006.01)
(Continued)

(52) U.S. Cl.
CPC ............... *A23L 29/284* (2016.08); *A23L 3/01* (2013.01); *A23L 5/13* (2016.08); *A23L 5/15* (2016.08);
(Continued)

(58) Field of Classification Search
CPC ... A23L 3/01; A23L 17/70; A23L 5/34; A23L 17/00
See application file for complete search history.

(56) References Cited

FOREIGN PATENT DOCUMENTS

| CN | 102551110 A | 7/2012 |
|---|---|---|
| CN | 102823889 A | 12/2012 |

(Continued)

OTHER PUBLICATIONS

Shie et al., "Physical Characteristics of Surimi Seafood as Affected by Thermal Processing Conditions". Journal of Food Science vol. 64, No. 2, 1999 (Year: 1999).*

(Continued)

*Primary Examiner* — Donald R Spamer
*Assistant Examiner* — Assaf Zilbering
(74) *Attorney, Agent, or Firm* — IPRO, PLLC

(57) ABSTRACT

The present invention discloses a microwave and conduction combined heating method for improving the gel strength of surimi products, belonging to the technical field of food processing. According to the present invention, surimi is first fully gelatinized by conduction heating, and then heated by microwave heating so that surimi gel can pass through a gel cracking zone quickly. This kind of microwave and conduction combined heating way can not only increase the gel strength of the surimi to achieve the desired elasticity, but
(Continued)

also can save a lot of time and improve the production efficiency. Compared with ordinary microwave heating, the microwave and conduction combined heating method of the conduction and microwave heat preservation, i.e. holding the temperature of the surimi products for a period of time by adjusting the microwave power level at a specified temperature range, can effectively improve the gel strength of the surimi and comply with the new trend of applying microwave heating to surimi products.

17 Claims, 8 Drawing Sheets

(51) Int. Cl.
    *A23L 5/10*        (2016.01)
    *A23L 5/30*        (2016.01)
    *A23L 17/00*      (2016.01)

(52) U.S. Cl.
    CPC ............... *A23L 5/34* (2016.08); *A23L 17/00* (2016.08); *A23L 17/70* (2016.08); *A23V 2002/00* (2013.01)

(56) References Cited

FOREIGN PATENT DOCUMENTS

| | | |
|---|---|---|
| CN | 104856117 A | 8/2015 |
| CN | 107242471 A | 10/2017 |
| EP | 0416782 A1 * | 3/1991 ............. A23L 17/70 |
| KR | 910002482 B1 | 4/1991 |

OTHER PUBLICATIONS

Hong et al., "Effects of Two Microwave Heating Methods on Gelling Properties of Silver Carp Surimi."—Abstract Modern Food Science and Technology 30(4):196-204 (Year: 2014).*
Fu et al., "Effect of microwave heating on the low-salt gel from silver carp (*Hypophthalmichthys molitrix*) surimi". Food Hydrocolloids 27(2012) 301-308. (Year: 2012).*
"GZB125 bowl cutter". Available online at http://en.xjfm.com/rsjgjx/eng/showcp.aspx?class=6&id=241 (Year: 2008).*
Yan, Hong et al., "Effects of Two Microwave Heating Methods on Gelling Properties of Silver Carp Surimi", Modern Food Science and Technology, 2014, vol. 30, No. 4, p. 196.
Xidong Jiao et. al. "Effects of fish oil incorporation on the gelling properties of silver carp surimi gel subjected to microwave heating combined with conduction heating treatment", Food Hydrocolloids, 2019, 94:164-173.
Tongwei CAO et. al. "Heating surimi products using microwave combined with steam methods: Study on energy saving and quality" Innovative Food Science and Emerging Technologies, 2018, 47: 231-240.
Linglu Meng et. al. "Effect of fish mince size on physicochemical and gelling properties of silver carp (*Hypophthalmichthys molitrix*) surimi gel" LWT—Food Science and Technology 149 (2021) 111912.

* cited by examiner

MICROWAVE AND CONDUCTION COMBINED HEATING METHOD FOR IMPROVING GEL STRENGTH OF SURIMI PRODUCTS

TECHNICAL FIELD

The disclosure herein relates to a microwave combined conduction heating method for improving the gel strength of surimi products, belonging to the technical field of food processing.

BACKGROUND

In recent years, with the development of the fisheries and processing technology, great progress has been made in the surimi product industry in China, developing from simple production in earlier times to the mechanization production of a series of new type of high grade of surimi products. The surimi products, made from high quality fish, have quickly become popular health foods because of their high protein content, low fat and calorie. The gel property of the surimi products is the comprehensive performance of gel strength, water holding capacity and whiteness. The most important part is the gel strength, which is also an important index to measure the quality of the surimi products.

Heat treatment is the most important part during the processing of the surimi product whose quality is determined by heat treatment temperature and heating rate. Usually, myofibrillar protein, dissolved by salt, would form a loose network structure, that is, the sol turns into a gel after some fish surimi has been chopped with salt. As a result, semitransparent gel is able to be formed under 40° C. The gel will crack at 50-70° C., and the network structure of the gel will gradually fracture. That is because the endogenous proteolytic enzymes in the fish are most active in this temperature range, causing a large number of peptide bonds of the myofibrillar protein to degrade and reducing surimi gel strength. High elastic opaque gel would be formed after continue heating at the temperature above 80° C. Therefore, in the conventional surimi products heating process, a two-step heating mode is usually adopted, that is, first performing conduction heating for 30 min in 40° C. water bath, and then performing conduction heating for 20 min in 90° C. water bath. However, it is not suitable for mass production due to the fact that the conventional gel method requires long time of fine temperature control and high energy consumption, the degree of gel deterioration is aggravated by long retention time between 50° C. and 70° C. and a lot of manpower is required.

Microwave heating uses polar molecules in materials to produce sharp rotation in the rapidly changing electromagnetic field, and produce frictional effects with neighboring molecules to heat up the materials. Therefore, microwave heating is considered to be a very potential heating mode in the processing of the surimi products processing. Microwave heating is realized on the basis of converting the amount of electromagnetic radiation absorbed by the materials into heat energy, and can heat rapidly and effectively from the interior. Compared with conventional conduction heating, microwave heating has the advantages of fast heat transfer, short heating time, uniform heating, high thermal efficiency, low cost and no pollution etc, which make it be widely applied to food heating. Microwave heating also has a significant advantage in the formation process of surimi gel because of that it can rapidly deactivate the endogenous proteolytic enzymes through the temperature range of 50-70° C. and avoid the deterioration of surimi gel. Some researchers have used microwave to directly heat the surimi products, and have obtained surimi products with higher gel strength to apply the characteristics of rapid heating of microwave heating. The pure microwave heated surimi products are usually harder and not more elastic because of the fast heating rate of microwave and the too fast loss of water, especially when the internal temperature of surimi reaches boiling point, the structure of surimi will be further destroyed. CN102551110A has disclosed a method of preparing low salt surimi fish sticks by microwave heating. Its main purpose is a method for making microwave-heated low-salt surimi fish sticks without salt or with low salt content. Yan Hong et al, (effect of two microwave heating treatment methods on gel properties of silver carp surimi [J]. Modern food science and technology, 2014, 30 (27) 196-204) adopted two segment of water bath and microwave heating method at constant microwave power, different heating times (the temperature is not controlled) and then improved the gel strength of surimi products. The microwave combined conduction heating in the present invention is based on the electromagnetic response characteristics of surimi components and dielectric enhancement mechanism of water, and combines the optimal conditions (constant temperature) glutamine transaminase in a surimi gel process, to increase the gel strength of the surimi products in a targeted and efficient manner.

SUMMARY

The object of the present invention is to provide a microwave combined conduction heating method for improving the gel strength of surimi products, and the surimi products include fish intestines, fish sticks, fish sausages, crab sticks, fish noodles, fish cakes, fish rolls and others with surimi as the main raw material; raw material fishes of the surimi include white fishes such as silver carp, pagrosomus major or *Nemipterus virgatus*; red fishes such as skipjack tuna, saury, mackerel or sardine, as well as cuttlefish and shrimp, and so on.

The method comprises the following steps: obtaining the surimi products through forming and cooking after performing thawing, empty chopping, salt chopping, spicery chopping, and pasting on frozen surimi; the forming and cooking is to form a specific shape of the surimi paste after pasting by means of a grouting die or a manual extrusion method, and after microwave combined conduction heating, obtaining the surimi products with high gel strength; the method of microwave combined conduction heating is as follows: gelling for 20-40 min under the condition of 40-50° C. water bath, then rising the temperature of the surimi to 80±2° C. at the microwave power of 3±1 W/g by using an intermittent heating method, and holding the temperature for 3 to 9 minutes. The cooked surimi products are cooled in ice water or cold tap water, and frozen-preserved after freezing package.

In an embodiment of the present invention, the microwave combined conduction heating way is as follows: gelling for 30 min under the condition of 40° C. water bath by a conduction heating method, then rising the temperature of the surimi products to 80° C. at a microwave power level of 3±1 W/g by using the intermittent heating method, and holding the temperature for 7 min.

In an embodiment of the present invention, the intermittent heating method is that heating for 20 to 30 s with microwave, and stopping heating for 20 to 30 s, which is a cycle, repeating this procedure until surimi samples are heated to 80-90° C., and holding for 5±1 min.

In an embodiment of the present invention, the intermittent heating method is that heating for 24 s with microwave, and stopping heating for 24 s, which is a cycle, repeating this procedure until the surimi samples are heated to 80±2° C., and holding the temperature for 5±1 min.

The temperature holding as described in "rising the temperature of the surimi to 80±2° C. at the microwave power level of 3±1 W/g and holding the temperature for 3 to 9 minutes" means that the central temperature of the surimi products fluctuates at 80±2° C. It can be achieved through two kinds of heating modes. First, when the microwave heating temperature reaches a set temperature at a power level of 3±1 W/g, the microwave stops heating. At this time, the central temperature of the surimi products is allowed to fluctuate at a set temperature of 80±2° C. When the central temperature is lower than a set temperature, heating is continued at the original power level, and when the heated temperature reaches the set temperature, the microwave stops heating so that the central temperature is maintained at the set temperature. Second, when heating to the set temperature with an appropriate microwave power level of 3±1 W/g, the power level of microwave heating is immediately changed to continue heating at a power level of ⅛-¼ of the original power level, so as to maintain the central temperature of the surimi to fluctuate at the set temperature of 80±2° C.

Through different grouting dies, the surimi products can be formed into different strips, blocks, etc. The shape of the die head can be changed according to the needs of production.

In an embodiment of the present invention, the thawing is to thaw the frozen surimi stored at −20° C. for 10-14 h at 4° C. so that the surface temperature of the surimi block is below 10° C., while the center temperature of the surimi block is below −3° C.

In an embodiment of the present invention, the empty chopping is as follows: putting the thawed surimi with center temperature being less than or equal to 5° C. to a chopping machine for empty chopping for 2-3 min at a chopping machine cutter shaft rotation speed of 2000-3000 r/min until the surimis stick together, then adding 1±0.1% of phosphate to the surimis for continue chopping and mixing until no hard particles of surimis exist, and finally obtaining empty chopped surimi. The role of phosphate added is to maintain the original flavor and nutrition of the surimi products, efficiently improve the water-retaining ability of the surimi products, and make the juice of the surimi products fresher and more delicate.

In an embodiment of the present invention, the empty chopping is as follows: cutting the thawed surimi into pieces with size of 2-3 cm$^3$ and putting them to a chopping machine for empty chopping for 2-3 min at a chopping machine cutter shaft rotation speed of 2000-3000 r/min and a temperature of 0-12° C. until the surimis stick together, then adding 1±0.1% of phosphate to the surimis for continue chopping and mixing until no hard particles of surimis exist.

In an embodiment of the present invention, the salt chopping is as follows: adding salt to the surimi after empty chopping at a ratio of 2-4% of the weight of the surimi, and performing salt chopping for 3-8 min at a cutter shaft rotation speed of 2000-3000 r/min until the surimi is completely dispersed and the paste becomes viscous. The purpose of adding salts is to increase the ion concentration so that the sol formed by expansion of the advanced structure of the salt-soluble protein in the surimi can facilitate the re-crosslinking of protein structure to form an elastic gel network structure. When the added amount of salt is less than 2%, it is not conducive to the dissolution of the salt-soluble protein, and the molecular structure of the protein cannot be completely expanded; if the amount of salt added is more than 4%, the surimi products will taste too salty to affect the flavor, furthermore, high NaCl content will increase the risks of hypertension and cardiovascular diseases. Therefore, the added amount of salt is 2-4%, preferably 2.8-3.2%.

In an embodiment of the present invention, the spicery chopping is as follows: adding 18±1% of soy emulsified paste to the surimi after salt chopping, then performing mixed chopping for 4-10 min at a cutter shaft rotation speed of 3000-4000 r/min, adding spices until the paste is fully mixed without particles touched by hands; the soy emulsified paste is a fine emulsified paste made by soy protein, chicken skin and ice water at a ratio of 1 to 1 to 5 in a chopping pan through emulsifying for 5-6 min. The spices are condiments capable of changing the flavor of the surimi products, such as pepper, chili powder, curry powder, etc. and the amount added is adjusted depending on actual conditions, usually 0.5-0.6 part by weight.

In an embodiment of the present invention, the soy protein emulsified paste is made by mixing soybean protein dry powder and chicken skin in a weight ratio of 1 to 1, adding 5 parts of ice water by weight, and emulsifying for 5-6 min. The emulsification treatment is to use a high-speed emulsifier for homogeneous emulsification for 5-6 min at a speed of 3000-4000 r/min.

In an embodiment of the present invention, the pasting is to add 14±1% of starch to the material after spicery chopping, and perform mixed chopping for 2-4 min at a cutter shaft rotation speed of 2000-3000 r/min so that the starch is distributed into a surimi system evenly to obtain the surimi product paste. The starches are commercially available Sakura starch or SH-52 starch and MQS-99 starch and tapioca starch. Fresh fish contains 72-80% of water and the rest is mostly protein. When the surimi products are heated, the protein loses its ability to bind to water due to denaturation, and the starch absorbs the water and gelatinizes to form a stable structure. Therefore, it is very important to add starch to guarantee the water retention of the surimi products and improve the structure.

During the process of empty chopping, salt chopping, spicery chopping and pasting, the temperature of surimi material is maintained less than 5° C. The chopping referred to adopt an intermittent chopping way, that is, chop 40-50 s in the chopping machine and stop the chopping machine for 30 s, and during the machine stop, scrape off the raw materials attached on the inner wall of chopping machine, repeat the above steps until the surimi materials achieve the desired state. By this way, it can avoid the temperature rise of surimi raw materials caused by heat generated from motor and friction, which is not compliance with the relevant provisions in the meat processing standard, thus affecting the gel strength.

According to a preferred embodiment of the present invention, the surimi products obtained by the microwave combined conduction heating method can achieve the gel strength of 800-900 g×cm.

Beneficial Effects: So far, the direct microwave heating will cause insufficient gelation before 50° C. and inadequate extension of myofibrillar protein molecules, so that the network structure formed by cross-linking has poor stability, affecting the quality and sensory characteristics of the surimi products. According to the present invention, the surimi is first fully gelatinized by conduction heating, and then heated by microwave heating so that surimi gel can pass through a gel cracking zone quickly. This kind of microwave combined conduction heating way can not only increase the gel strength of the surimi to achieve the desired elasticity, but also can save a lot of time and improve the production efficiency. Compared with ordinary microwave heating, the microwave combined conduction heating method of the conduction and microwave heat preservation, i.e. holding the temperature of the surimi products for a period of time by adjusting the microwave power level at a specified temperature range, can effectively improve the gel strength of the surimi and comply with the new trend of applying microwave heating to surimi products.

Specifically, the method of microwave combined conduction heating (FIG. 1) is utilized, with the advantages of conduction and microwave heating. When the temperature is lower than 50° C., the surimi products are gelatinized sufficiently by conduction heating, the myofibrillar protein molecules can be fully extended and crosslinked to form a network structure. The subsequent microwave heating and preservation method can quickly pass the surimi gel cracking zone, so that the endogenous proteolytic enzyme can be rapidly deactivated to avoid gel degradation. This kind of microwave combined conduction heating method has the characteristics of high heating speed, high energy utilization rate and high production efficiency. Compared with the conventional two-step conduction heating, the gel strength is increased by 1.6 times or above (FIG. 6), and the structure is more uniform and compact (FIG. 8), and the texture is more delicate. It enhances the water-holding capacity (Table 2) and elasticity (FIG. 5) while the whiteness of the surimi has little difference (Table 1). In addition, compared with the conventional microwave heating, the microwave combined conduction heating method has the advantages of low water loss rate (Table 2) and less influence on the shape (FIG. 7). This method does not add any plasticizer, adhesive or higher-priced enzyme preparation, and is low in cost.

BRIEF DESCRIPTION OF FIGURES

in FIGS. 4 to 8, A represents a microwave combined conduction heating method of the present invention, B represents a conventional microwave heating method, and C represents a conventional two-step step conduction heating method.

DETAILED DESCRIPTION

Figure 1:
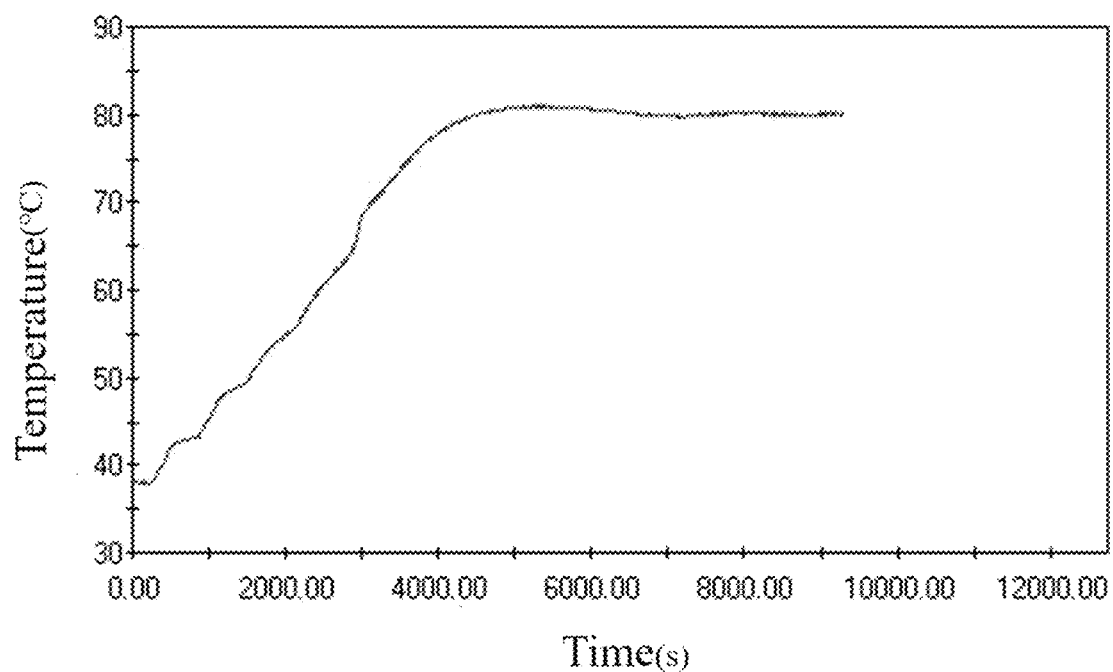
FIG. 1 shows a heat preservation curve of a microwave combined conduction heating method.

The surimis used in the following embodiments are products available on the markets, for example, the frozen pagrosomus major surimi sold by Ningbo Jinhai Aquatic Product & Food Co., Ltd.

High-speed emulsifiers used in the following embodiments are products available on the markets, for example, FA25 high-speed emulsifiers sold by FLUKO.

Chopping machines used in the following embodiments are "Shenfa" brand high-speed chopping machines sold by Shanghai Shenfa Machinery Co., Ltd. or "XiaoJin" brand high-speed chopping machines sold by Hebei XiaoJin Machinery Manufacturing Inc.

Embodiment 1

This embodiment adopts an optimized microwave combined conduction heating method, which is as follows:

A. Thawing

Thawing the frozen pagrosomus major surimi of Ningbo Jinhai Aquatic Product & Food stored at −20° C. for 10-14 h at 4° C., so that the surface temperature of the surimi block is below 10° C. while the center temperature of the surimi block is below −3° C.

B. Soy Emulsified Paste

Adding soy protein, chicken skin and ice water at a ratio of 1 to 1 to 5 to a chopping pan, and emulsifying for 5-6 min until the materials become fine emulsified paste.

C. Empty Chopping

Putting the thawed surimi with center temperature being less than or equal to 5° C. to a chopping machine for empty chopping for 2-3 min at a chopping machine cutter shaft rotation speed of 2000-3000 r/min until the surimis stick together, then adding 1±0.1% of phosphate to the surimis for continue chopping and mixing until no hard particles of surimis exist, and finally obtaining empty chopped surimi.

D. Salt Chopping

Adding salt to the surimi after empty chopping obtained in step C at a ratio of 2-4% of the weight of the surimi, and performing salt chopping for 3-8 min at a cutter shaft rotation speed of 2000-3000 r/min until the surimi is completely dispersed and the paste becomes viscous.

E. Spicery Chopping

Adding 18±1% of soy emulsified paste obtained in step C to the surimi after salt chopping obtained in step D, then performing mixed chopping for 4-10 min at a cutter shaft rotation speed of 3000-4000 r/min, and adding spices until the paste is fully mixed without particles touched by hands.

F. Pasting

Adding 14±1% of starch in the step E, and performing mixed chopping for 2-4 min at a cutter shaft rotation speed of 2000-3000 r/min so that the starch is distributed into the surimi system evenly to obtain the surimi product paste.

G. Forming and Cooking

The surimi paste obtained in step F is made into special shape by means of a grouting die or a manual extrusion method. The formed surimi products are gelatinized for 30 min in a 38-42° C. (preferably 40° C.) water bath in a conduction heating way, then the surimi products after water bath conduction heating undergo intermittent heating to 70, 80, 90° C. at the power level of 3±1 W/g, 5±1 W/g, 7±1 W/g (preferably 3 W/g) and keep warm for 3-9 min (preferably 80° C., 5 min).

The intermittent heating is to heat for 24 s by microwave heating and stop for 24 s, then repeat the procedure until the temperature reaches the set temperature.

Figure 2:
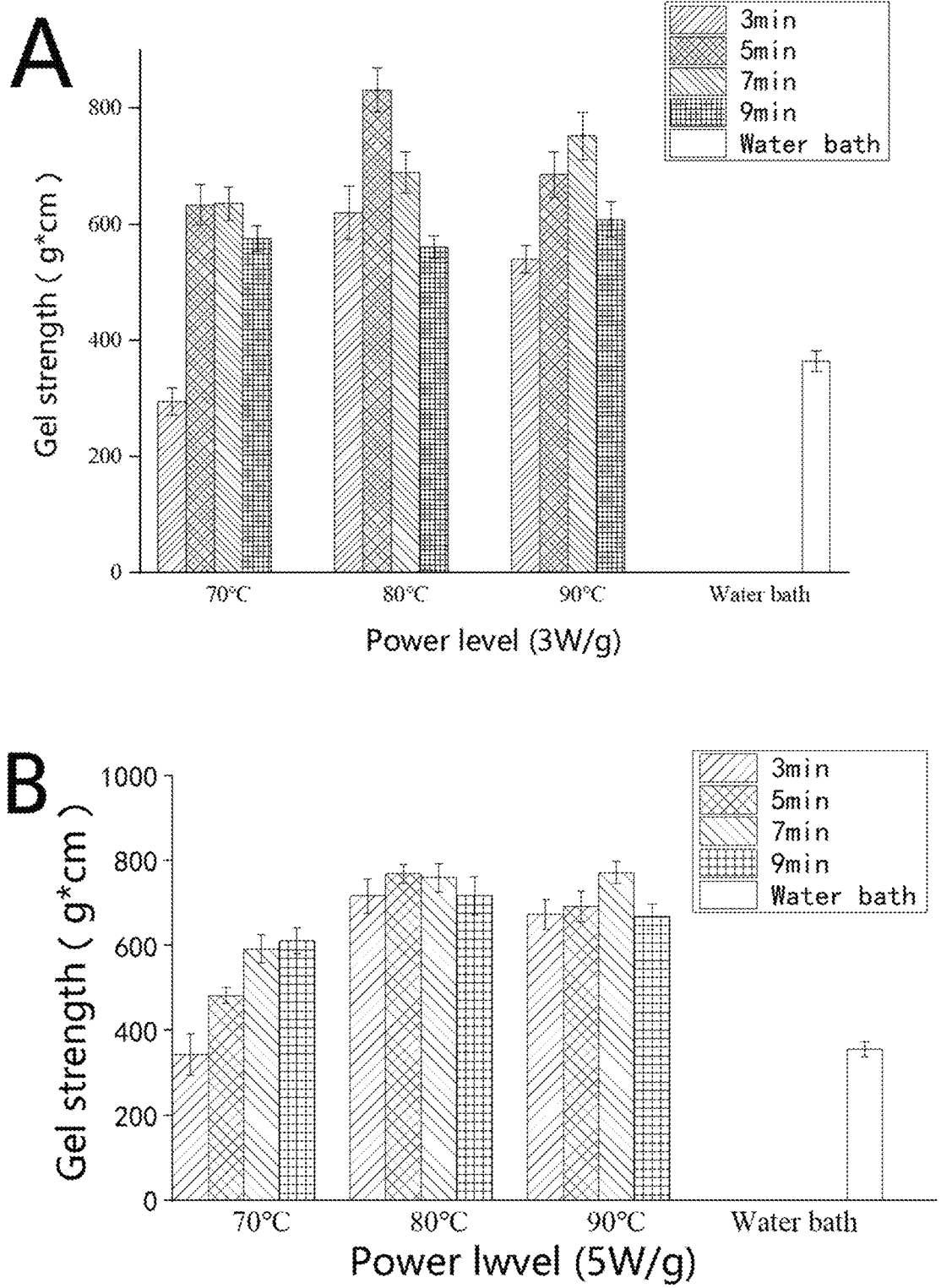
FIG. 2 shows the influence of different microwave combined conduction heating conditions on the quality of surimi products. A represents the gel strength at a microwave power level of 3 W/g, B represents the gel strength at a microwave power level of 5 W/g, C represents the gel strength at a microwave power level of 7 W/g; a represents the water-holding capacity at a microwave power level of 3 W/g, b represents the water-holding capacity at a microwave power level of 5 W/g, c represents the water-holding capacity at a microwave power level of 7 W/g.
Figure 2:
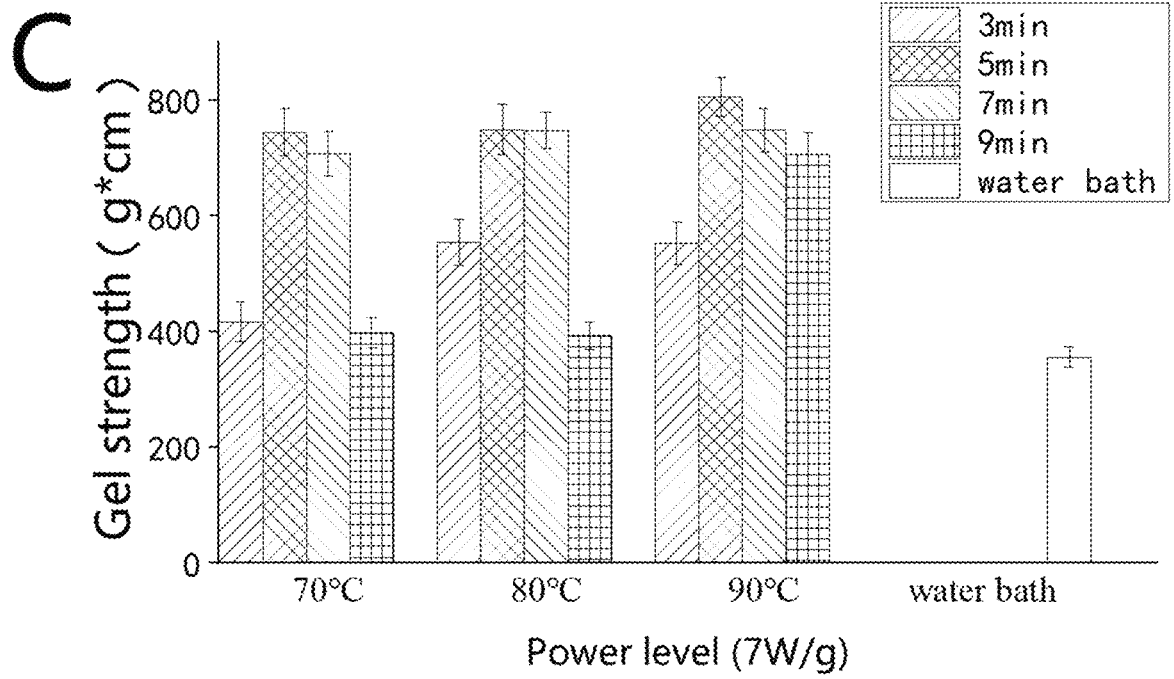
Figure 2:
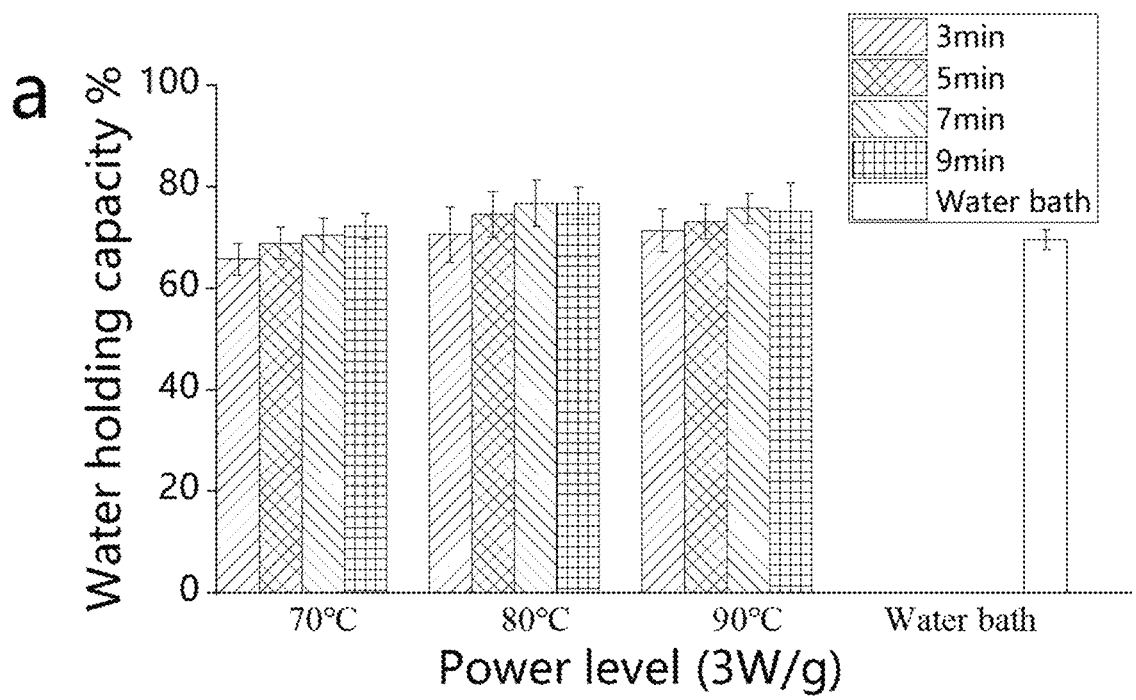
Figure 2:
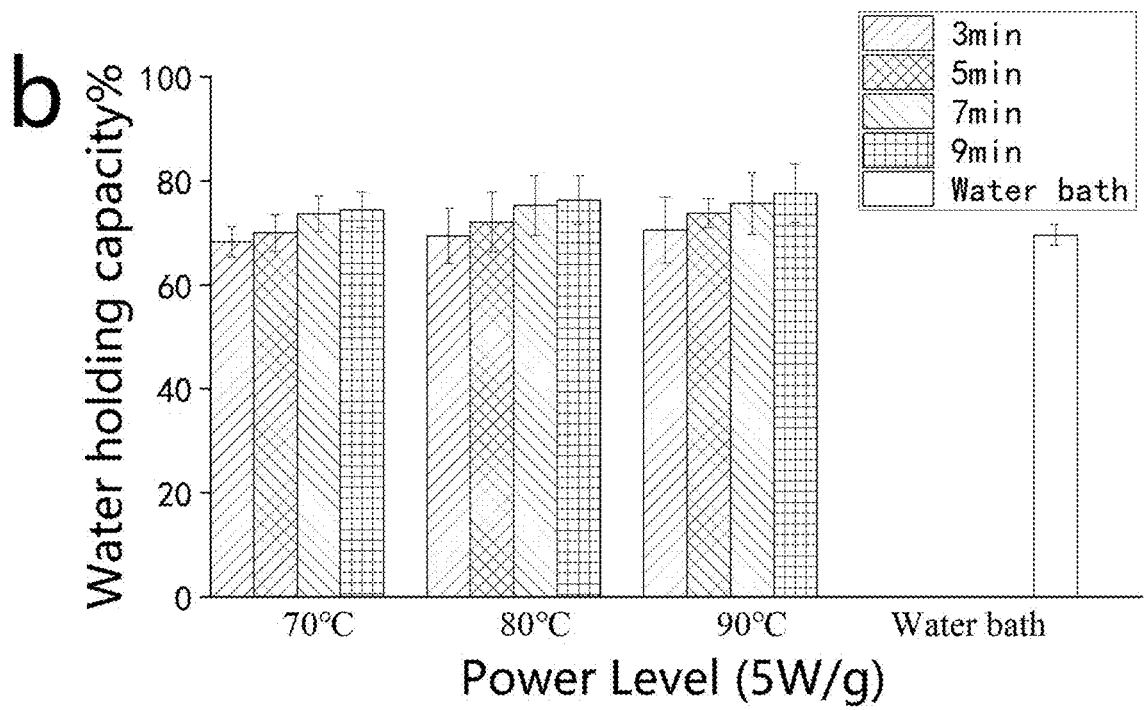
Figure 2:
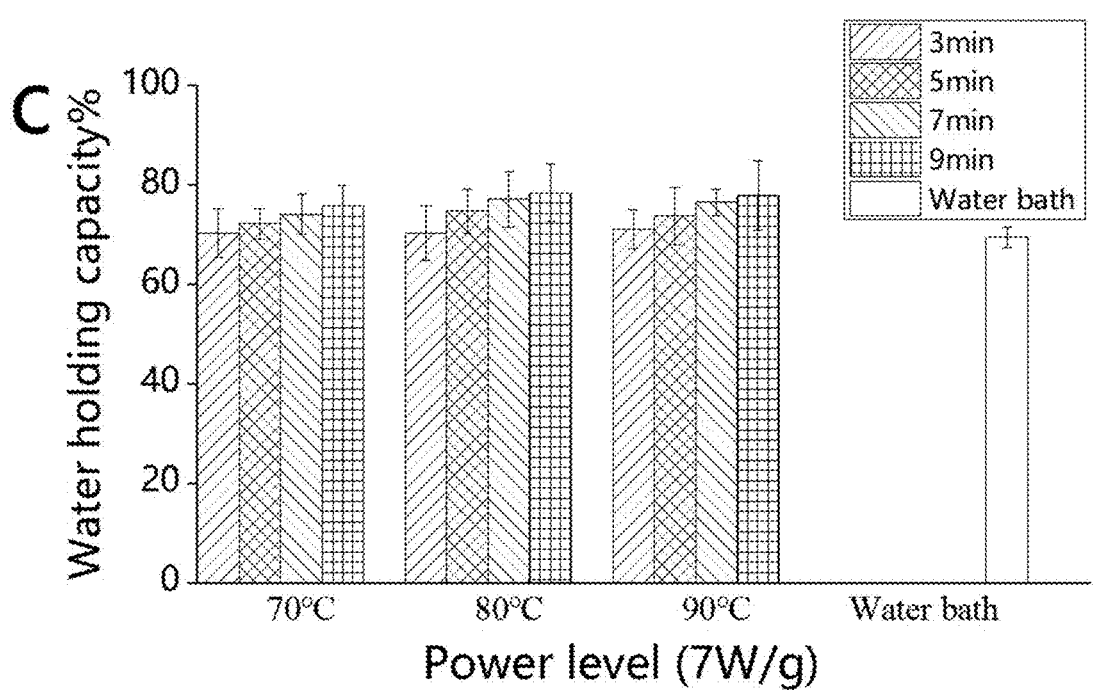
Figure 3:
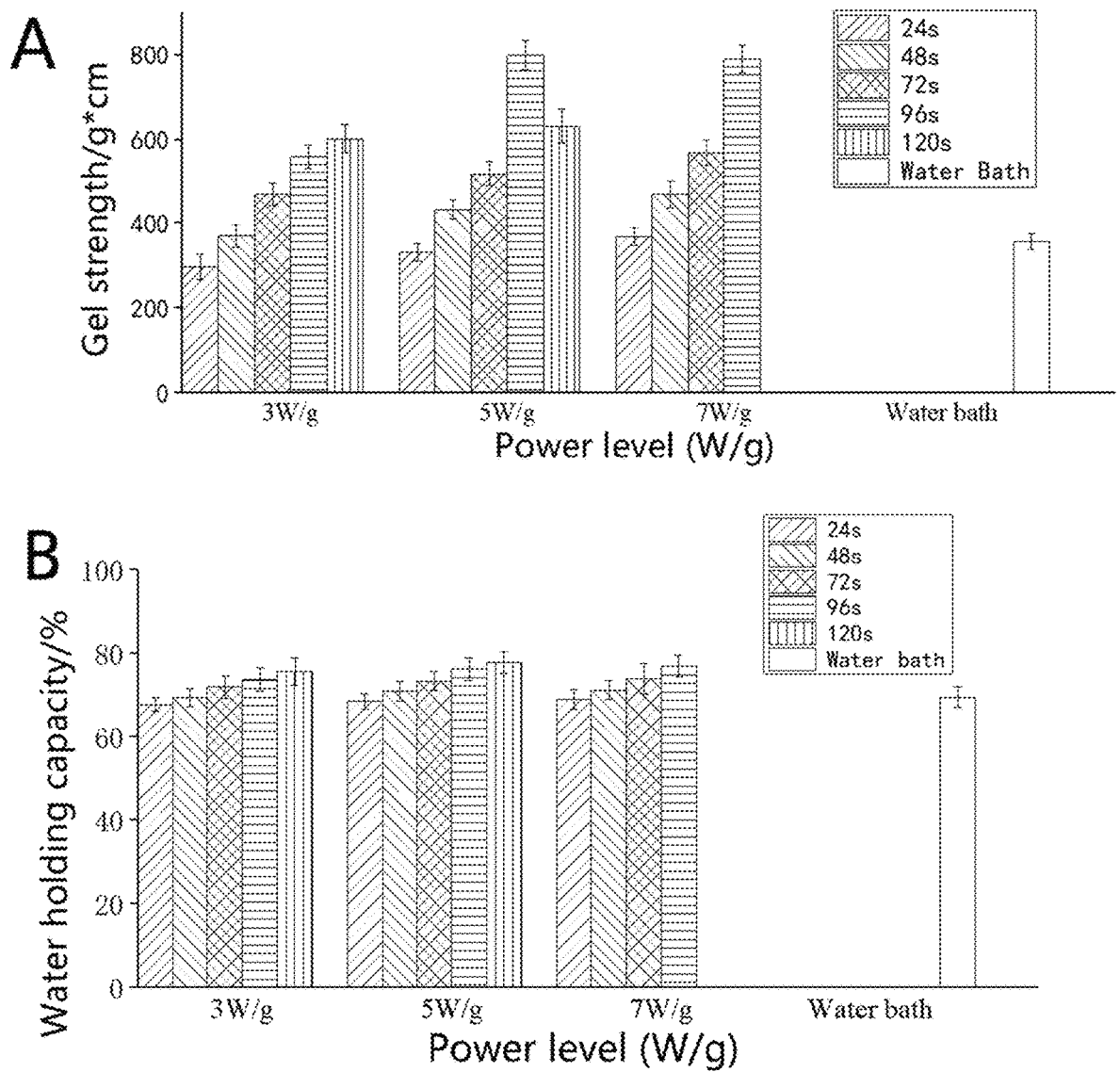
FIG. 3 shows an optimization diagram of a conventional microwave heating method, A: gel strength, B: water-holding capacity.
Figure 4:
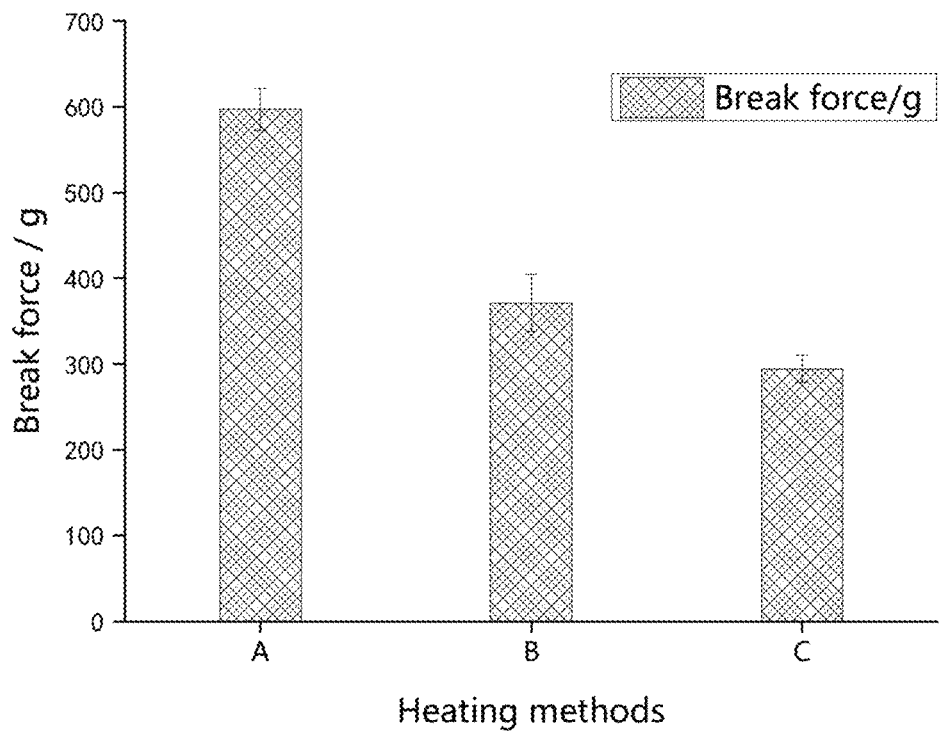
FIG. 4 shows a breaking force diagram of surimi products treated with different heating methods under an optimal condition.
Figure 5:
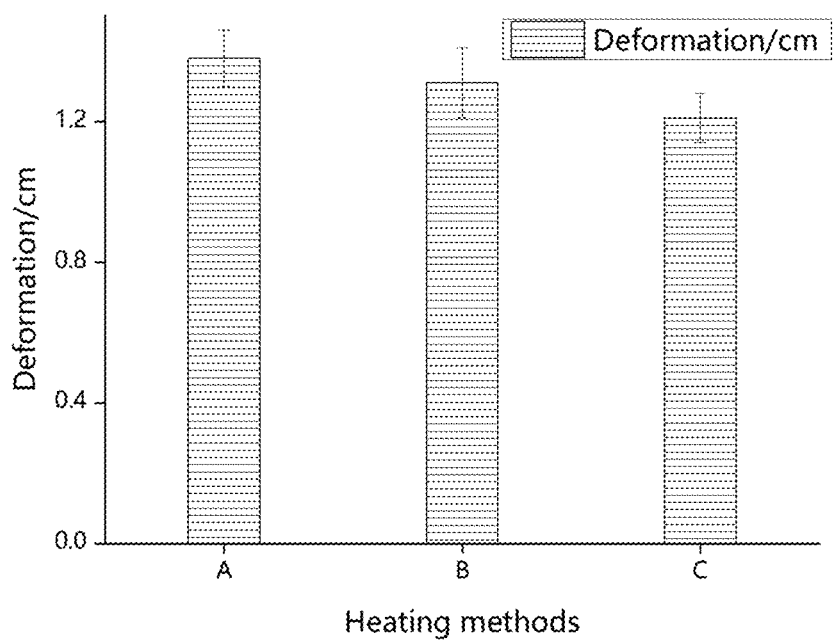
FIG. 5 shows a breaking distance diagram of surimi products treated with different heating methods under an optimal condition.
Figure 6:
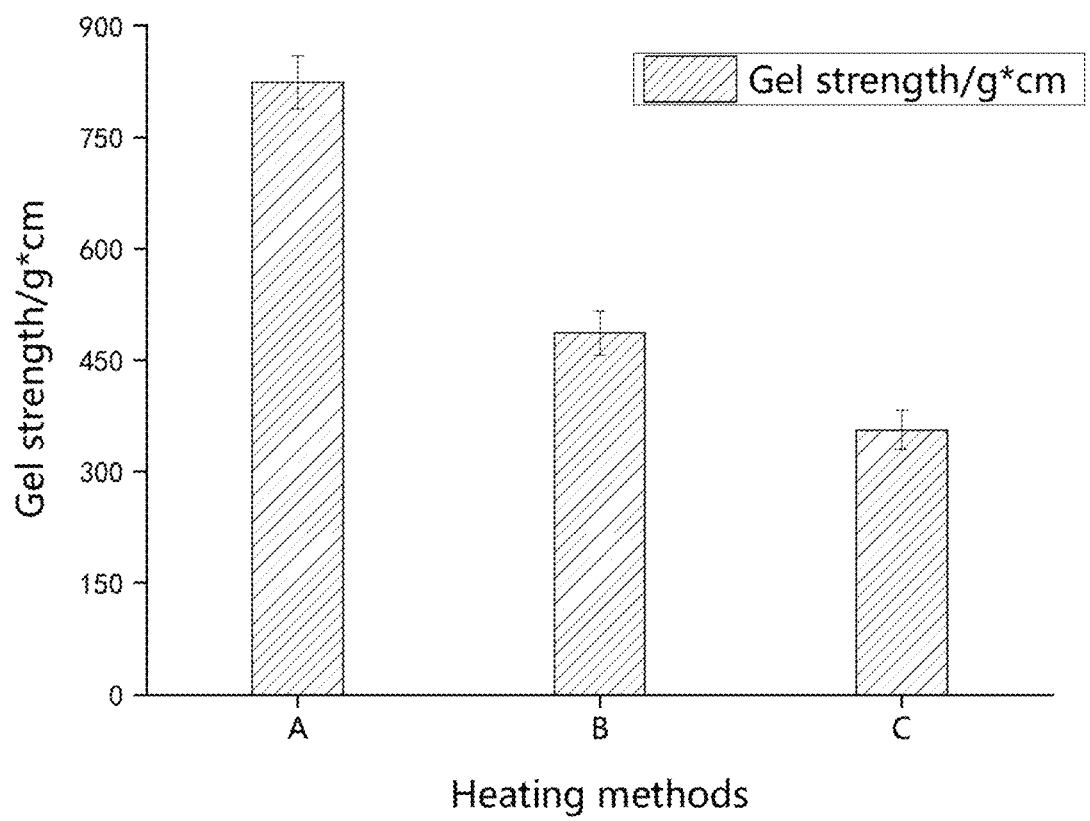
FIG. 6 shows a gel strength diagram of surimi products treated with different heating methods under an optimal condition.
Figure 7:
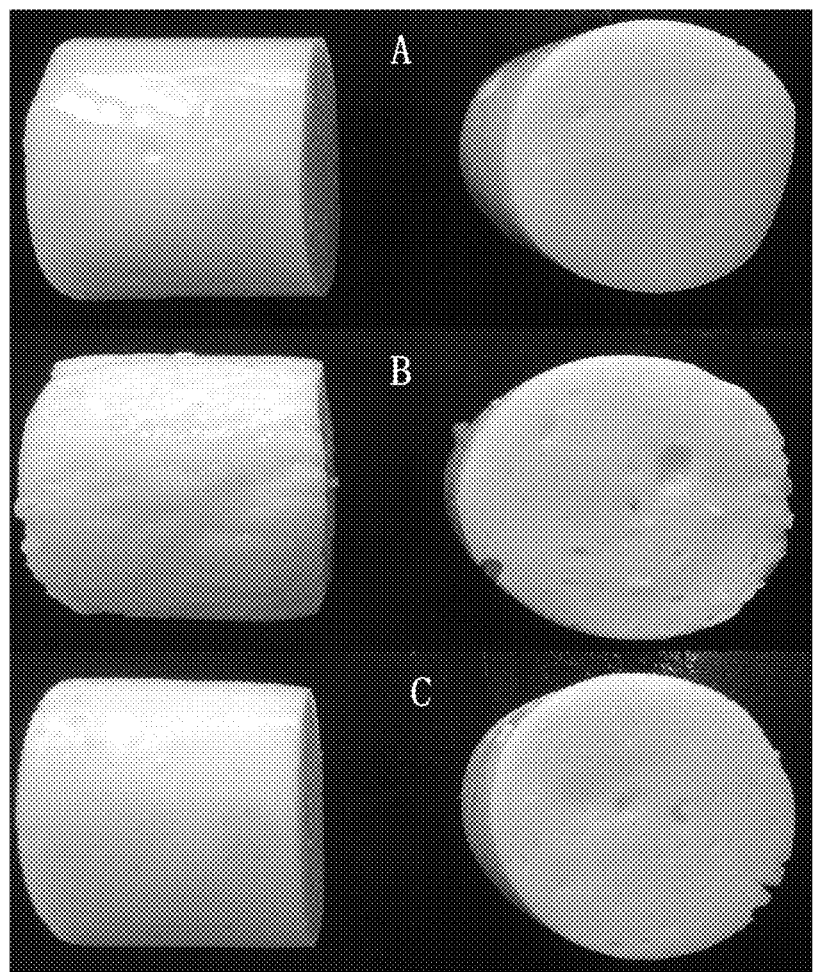
FIG. 7 shows a photograph of fish intestines cooked with different heating methods under an optimal condition.
Figure 8:
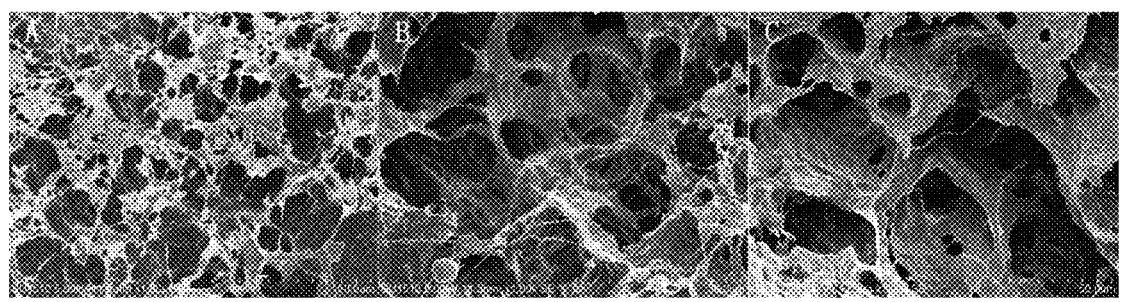
FIG. 8 shows a scanning electron micrograph (×1000) of surimi products after gel cooked with different heating methods under an optimal condition.

The microwave heating temperature is detected online by fiber probes provided by FISO, Canada. When the temperature of microwave heating reaches the set temperature, the microwave stops heating. When the temperature is lower than the set temperature, the microwave continues to heat at the original power level until the set temperature is reached. This process is repeated at the set temperature for a certain period of time (FIG. 1). At the end of microwave heating, surimi products with higher gel strength are obtained. The optimum condition of the microwave combined conduction heating method: heating to 80±2° C. and holding 5 min at the power level of 3±1 W/g (FIG. 2). The holding process allows a fluctuation of 2° C. at the set temperature.

Embodiment 2

The difference between embodiment 2 and embodiment 1 is as follows: for the microwave combined conduction heating method, when the temperature of microwave heating reaches the set temperature, reduce the microwave power and continue to heat at a power level of ⅛-¼ of the original power level, so as to maintain the central temperature of surimi to fluctuate at the set temperature for ±2° C. If the temperature of the surimi is higher than the set temperature, reduce the power level at this time until the temperature returns to the set temperature and maintains for a period of time.

Comparative Embodiment 1

This comparative embodiment adopts optimized conditions of the conventional microwave heating method.

The specific procedures of comparative embodiment 1 are the same as those in embodiment 1, with the difference as follows: after the surimi is formed in step G, the conventional microwave heating mode is adopted, i.e., the formed fish tofu is heated at a constant power level of 3 W/g, 5 W/g, and 7 W/g in an intermittent heating way for 24 s, and stopped for 24 s, with a total microwave heating time of 24, 48, 72, 96, 120 s; after heating, the surimi products through conventional microwave heating are obtained. Wherein, the optimal condition of the conventional microwave heating method is power level of 5 w/g and heating time of 72 s.

Comparative Embodiment 2

The procedures of comparative embodiment 2 are the same as those in embodiment 1, with the difference as follows: in the forming and cooking step, a well-known conventional two-step heating mode is adopted rather than a microwave combined conduction heating mode, that is, first perform conduction heating for 30 min at 40° C. water bath, then take out and immediately put to 90° C. water bath to perform conduction heating for 20 min. At the end of heating, the surimi products of conventional conduction heating are obtained.

TABLE 1

Determiantion of whiteness of surimi products treated by different heating methods at an optimal condition

| Heating way | L* | a* | b* | Whiteness |
|---|---|---|---|---|
| A | 85.96 ± 0.36 | −1.62 ± 0.05 | 7.74 ± 0.08 | 83.89 ± 0.12 |
| B | 85.69 ± 0.38 | −1.6 ± 0.05 | 7.75 ± 0.09 | 83.64 ± 0.23 |
| C | 85.93 ± 0.26 | −1.62 ± 0.03 | 7.94 ± 0.05 | 83.76 ± 0.1 |

TABLE 2

Water loss rate and water-holding capacity of surimi products treated by different heating methods at an optimal condition

| Heating way | Water loss rate % | Water-holding capacity % |
|---|---|---|
| A | 4.06 ± 0.38 | 73.96 ± 0.27 |
| B | 4.25 ± 0.35 | 72.56 ± 0.36 |
| C | 3.89 ± 0.29 | 69.02 ± 0.13 |

In the tables above, A represents microwave combined conduction heating method in the present invention, B represents conventional microwave heating way, and C represents conventional two-step conduction heating method.

What is claimed is:

1. A method for improving the gel strength of surimi products, comprising the following steps:
   obtaining surimi products from frozen surimi through performing one or more of thawing, chopping, chopping with salt, chopping with spices, and pasting, and forming-and-cooking the surimi product by:
   a) forming a surimi paste with a specific shape after pasting with a grouting die or a manual extrusion apparatus;
   b) gelling for 20 to 40 minutes under at 40° C. to 50° C. in a water bath,
   c) heating for 20 second to 30 seconds in a microwave followed by no heating for 20 seconds to 30 seconds to form a cycle at a microwave power level of 3±1 W/g;
   d) repeating the cycle of step c) until the surimi products are heated to 80° C.±2° C.; and
   e) holding the temperature for 5±1 minutes, thereby obtaining surimi products with high gel strength.

2. The method for improving the gel strength of surimi products according to claim 1, wherein the method comprises:
   gelling for 30 minutes at 40° C. in a water bath by a conduction heating method, and
   raising the temperature of the surimi products to 80° C. at a microwave power level of 3±1 W/g by intermittent heating.

3. The method for improving the gel strength of surimi products according to claim 1, wherein the cycle comprises:
   heating for 24 seconds with a microwave followed by no heating for 24 seconds.

4. The method for improving the gel strength of surimi products according to claim 1, wherein thawing comprises thawing the frozen surimi stored at −20° C. for 10 to 14 hours at 4° C. such that a surface temperature of a block of the surimi products is below 10° C., while a center temperature of the block of the surimi products is below −3° C.

5. The method for improving the gel strength of surimi products according to claim 2, wherein thawing comprises thawing the frozen surimi stored at −20° C. for 10 to 14 hours at 4° C. such that the surface temperature of a block of the surimi products is below 10° C., while the center temperature of the block of the surimi products is below −3° C.

6. The method for improving the gel strength of surimi products according to claim 1, wherein chopping comprises:
   inserting thawed surimi with a center temperature of less than or equal to 5° C. into a chopping machine for to 3 minutes at a chopping machine cutter shaft rotation speed of 2000 to 3000 rotations per minute until the surimi sticks together, then
   adding 1±0.1% of phosphate to the surimi for continued chopping and mixing until no hard particles of surimi exist.

7. The method for improving the gel strength of surimi products according to claim 2, wherein chopping comprises:
   inserting thawed surimi with a center temperature of less than or equal to 5° C. into a chopping machine for 2 to 3 minutes at a chopping machine cutter shaft rotation speed of 2000 to 3000 rotations per minute until the surimi sticks together, then
   adding 1±0.1% of phosphate to the surimi for continue chopping and mixing until no hard particles of surimi exist.

8. The method for improving the gel strength of surimi products according to claim 1, wherein chopping comprises:
   inserting thawed surimi with a center temperature of less than or equal to 5° C. into a chopping machine for 2 to 3 minutes at a chopping machine cutter shaft rotation speed of 2000 to 3000 rotations per minute until the surimi sticks together, then
   adding 1±0.1% of phosphate to the surimi for continue chopping and mixing until no hard particles of surimi exist.

9. The method for improving the gel strength of surimi products according to claim 3, wherein chopping comprises:
   inserting the thawed surimi with center temperature of less than or equal to 5° C. into a chopping machine for 2 to 3 minutes at a chopping machine cutter shaft rotation speed of 2000 to 3000 rotations per minute until the surimi sticks together, then
   adding 1±0.1% of phosphate to the surimi for continue chopping and mixing until no hard particles of surimi exist.

10. The method for improving the gel strength of surimi products according to claim 5, wherein chopping comprises:
    inserting thawed surimi with center temperature being less than or equal to 5° C. to a chopping machine for 2 to 3 minutes at a chopping machine cutter shaft rotation speed of 2000 to 3000 rotations per minute until the surimi sticks together, then
    adding 1±0.1% of phosphate to the surimi for continue chopping and mixing until no hard particles of surimi exist.

11. The method for improving the gel strength of surimi products according to claim 1, wherein chopping with salt comprises:
    adding salt to the surimi after chopping at a ratio of 2 to 4% of the weight of the surimi, and
    chopping with the salt for 3 to 8 minutes at a cutter shaft rotation speed of 2000 to 3000 rotations per minute until the surimi is completely dispersed and the paste becomes viscous.

12. The method for improving the gel strength of surimi products according to claim 10, wherein chopping with salt comprises:
    adding salt to the surimi after chopping at a ratio of 2 to 4% of the weight of the surimi, and
    chopping with the salt for 3 to 8 minutes at a cutter shaft rotation speed of 2000 to 3000 rotations per minute until the surimi is completely dispersed and the paste becomes viscous.

13. The method for improving the gel strength of surimi products according to claim 1, wherein:
    i) chopping with spices comprises:
    adding 18±1% of soy emulsified paste to the surimi after chopping with salt, then
    chopping for 4 to 10 minutes at a cutter shaft rotation speed of 3000 to 4000 rotations per minute, and
    adding spices until the paste is fully mixed without particles touched by hands;
    wherein the soy emulsified paste is an emulsified paste comprising soy protein, chicken skin, and ice water added at a ratio of 1 to 1 to 5 in a chopping pan through emulsifying for 5 to 6 minutes;
    ii) pasting comprises:
    adding 14±1% of starch after chopping with spices, and
    chopping for 2 to 4 minutes at a cutter shaft rotation speed of 2000 to 3000 rotations per minute such that the starch is distributed into the surimi evenly.

14. The method for improving the gel strength of surimi products according to claim 12, wherein:
    i) chopping with spices comprises:
    adding 18±1% of soy emulsified paste to the surimi after chopping with salt, then
    chopping for 4 to 10 minutes at a cutter shaft rotation speed of 3000 to 4000 rotations per minute, and
    adding spices until the paste is fully mixed without particles touched by hands;
    wherein the soy emulsified paste is a fine emulsified paste comprising soy protein, chicken skin, and ice water at a ratio of 1 to 1 to 5 combined in a chopping pan through emulsifying for 5 to 6 minutes;
    ii) pasting comprises:
    adding 14±1% of starch to the material after chopping with spices, and
    chopping for 2 to 4 minutes at a cutter shaft rotation speed of 2000 to 3000 rotations per minute such that the starch is distributed into surimi evenly.

15. The method for improving the gel strength of surimi products according to claim 1, wherein the surimi products comprise: fish intestines, fish sticks, fish sausages, crab sticks, fish noodles, fish cakes, fish rolls, and others, with surimi as the main raw material; and
    wherein the raw material comprises silver carp, pagrosomus major, *Nemipterus virgatus*, skipjack tuna, saury, mackerel, sardine, cuttlefish, and/or shrimp.

16. The method for improving the gel strength of surimi products according to claim 14, wherein the surimi products comprise: fish intestines, fish sticks, fish sausages, crab sticks, fish noodles, fish cakes, fish rolls, and others, with surimi as the main raw material;
    Wherein the raw material comprises silver carp, pagrosomus major, *Nemipterus virgatus*, skipjack tuna, saury, mackerel, sardine, cuttlefish, and/or shrimp.

17. The method of claim 1, wherein the chopping is performed using a Shenfa brand high-speed chopping machine or XiaoJin brand high-speed chopping machine.

* * * * *